Figure 1:
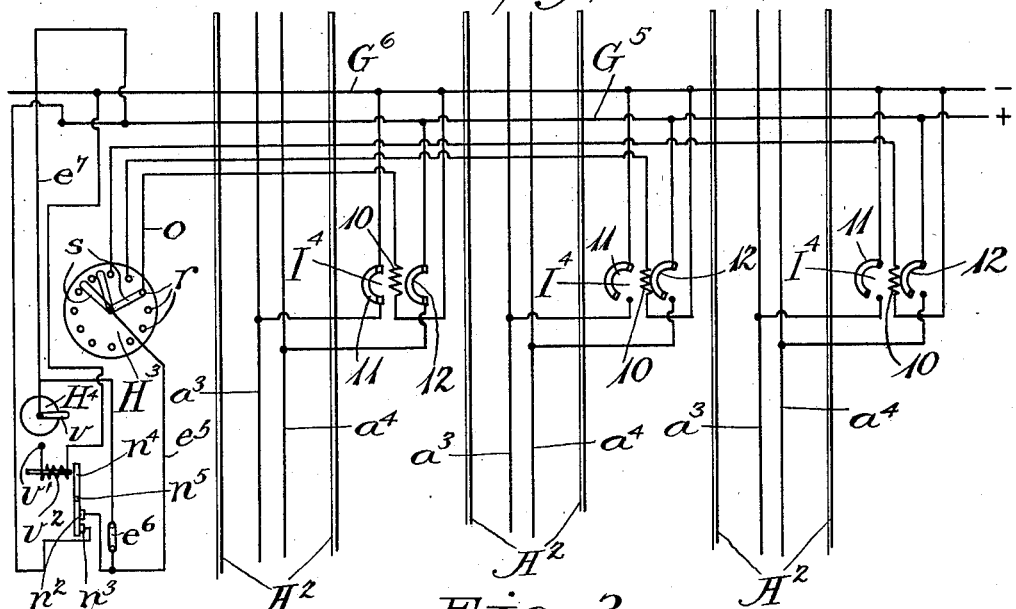

T. F. MULLANEY.
ELECTRICAL SYSTEM FOR TRANSFERRING CARS.
APPLICATION FILED OCT. 11, 1913.

1,097,137.
Patented May 19, 1914.

WITNESSES:

INVENTOR
Thomas F. Mullaney.
BY
Attorneys

UNITED STATES PATENT OFFICE.

THOMAS F. MULLANEY, OF NEW YORK, N. Y.

ELECTRICAL SYSTEM FOR TRANSFERRING CARS.

1,097,137.      Specification of Letters Patent.      Patented May 19, 1914.

Original application filed February 26, 1909, Serial No. 480,222. Divided and this application filed October 11, 1913. Serial No. 794,611.

*To all whom it may concern:*

Be it known that I, THOMAS F. MULLANEY, a citizen of the United States, residing in the city of New York, borough of Manhattan, county and State of New York, have invented a certain new and useful Electrical System for Transferring Cars, of which the following is a specification.

This invention is an electrical system for controlling power circuits in places where electrically operated cars are stored.

There are many methods in vogue at the present time for storing cars. Chief among these methods is the one wherein cars are run in from the main line track and stored on parallel tracks each of which is a branch of the main track. Another common expedient, and the one principally used in car barns, is to install a series of incoming tracks, each of which is a branch of the main track, and each of which incoming tracks leads to a common "car pit." In the bottom of the car pit is located a track, at right angles to the incoming tracks, on which track is adapted to operate, a "transfer" or pit car. The platform of the transfer car is provided with a track, positioned at right angles to the track on which said car travels, and occupying the same plane as the in-coming tracks. A series of storage tracks leads from that side of the car pit opposite the in-coming tracks, and occupies the same plane thereof, so that an incoming car may be loaded on to the platform of the transfer car, the latter then moved so that its platform track is brought into alinement with one of the storage tracks, and the car loaded thereon then delivered to said storage track. In both of the foregoing systems of storage, however, both the in-coming and storage tracks are at all times "live" tracks, and, as a result conflagrations frequently occur in the cars, not to speak of other accidents, owing to poorly insulated or otherwise defective circuits. For the specified reasons, among others, underwriters have placed high rates of insurance on buildings equipped with systems of the character described, and, in some instances, have practically declined to assume insurance risks thereon. Experience shows, moreover, that when tracks are allowed to remain charged, careless attendants neglect to turn out the lights in the cars, and, in this way, a very considerable useless expense is entailed.

The present invention is designed to overcome the several disadvantages referred to and, in one phase, may be said to consist in the provision of means whereby all the tracks connected with the storage system and independent of the main tracks may be normally "dead," *i. e.*, uncharged.

By the present invention the electrical energy for operating the cars on any of the tracks is preferably controllable independently of the main track. Moreover, in the systems wherein the pit car is used, the means for energizing of the in-coming and storage tracks, as well as the pit car propelling and operating mechanism, is made controllable at the will of the operator, and any of these parts may, if so desired, be energized to the exclusion of the remaining parts.

A salient feature of this invention consists of timing mechanism whereby I am enabled to keep any one or more of the tracks charged for a predetermined length of time, only, at the expiration of which time they are automatically rendered dead.

Various functions and advantages of the invention, other than those enumerated, will appear from the hereinafter detailed description thereof.

In the accompanying drawings I have illustrated different practical embodiments of the invention, but the constructions shown therein are to be understood as illustrative, only, and not as defining the limits of the invention.

Figure 2:
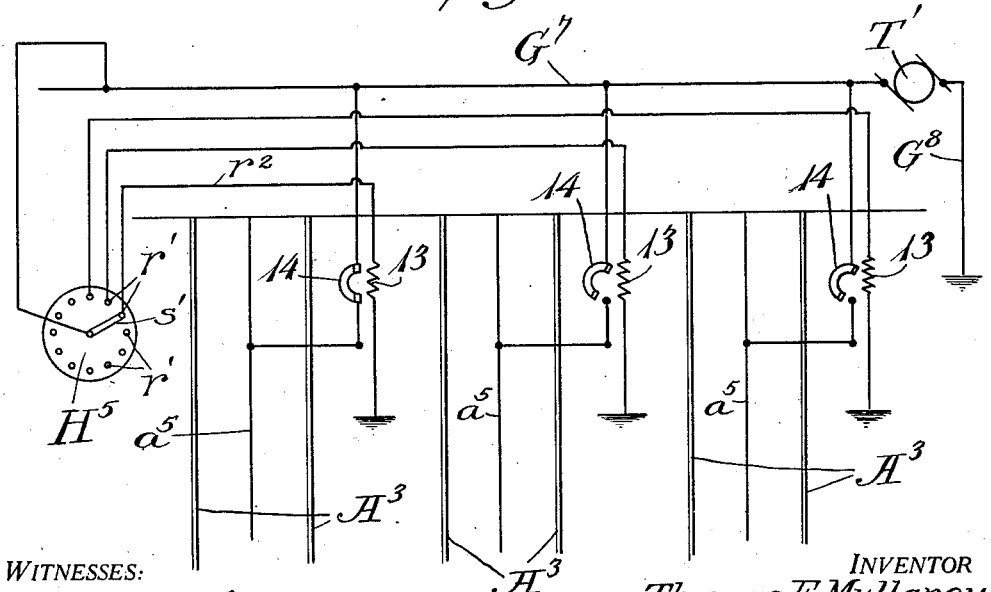

Figure 1 is a diagrammatic view illustrating the adaptability of the present invention to systems wherein the cars are stored on parallel branches of the main track. The view also shows the application of my improved timing mechanism. Fig. 2 is a like view, illustrating the application of the present invention to systems of the type employing a pit car. In this view the timing mechanism is omitted.

The invention may be applied to systems embodying underground metallic conduit circuits, overhead trolley and grounded circuits, double trolley systems, or any other type of electrical distribution. In Fig. 1 of the drawings, I have, for the purpose of illustration, shown the invention as applied to a metallic underground system. In said figure, $A^2$ represents the branch tracks leading from the main line (not shown) on which branch tracks cars are adapted to be stored. Each of the tracks $A^2$ is provided with conductor rails $a^3$, $a^4$, through which the current for propelling the cars is led. $I^4$ represents a circuit breaker for use in combination with each track. Each circuit breaker $I^4$ embodies a coil 10 and movable members 11 and 12 which coöperate with the single coil to, in effect, constitute two (2) circuit breakers. $G^5$ represents one main, and $G^6$ the other main for carrying the electrical energy from the power house or central station. $H^3$ is a controller or switch, located at some readily accessible point, and operated manually by an attendant in charge thereof. Said switch is provided with a plurality of contacts $r$, and a series of switch levers $s$, the function of which will hereinafter appear.

Assuming now that it is desired to energize the track $A^2$, nearest to the switch board, the attendant throws one of the switch levers, $s$, into connection with the proper contact, $r$. A circuit is thereby established from main $G^6$, through coil 10, of the circuit breaker, $I^4$, wire connection, O, controller $H^3$, connection, $e^5$, switch, $e^6$, connection $e^7$, back through main, $G^5$. In the form of circuit breaker employed in the present embodiment of the invention, the movable members 11 and 12 are held in their opened positions by a spring or weight, and the energizing of coil 10, overcoming the action of the spring or weight, throws said movable members 11 and 12 into their closed positions. A circuit is thus completed from main $G^5$, member 12 to conductor rail, $a^4$, thence through motor on in-coming car to conductor rail, $a^3$, movable member 11 back to main, $G^6$, thereby energizing the track. In a similar manner, by manipulating one or more of the other two levers, $s$, any other track, or plurality of tracks, may be energized.

It will be noted that, in the operation just described, the switch, $s$, and contact, $r$, referred to, are such as correspond to the track $A^2$, nearest the switch board and for clearness sake the parts in Fig. 1, of the drawing are shown in the positions which they assume while the operation just described is being carried out. Consequently, the movable members 11 and 12 relative to the track nearest the switch board are shown in closed position, and the movable members 11 and 12 of the remaining tracks are shown in opened positions.

If it is desired to energize one or more of the tracks for a predetermined time, I utilize the time switch, $H^4$, referred to above, which may be included in circuit, $H^3$. The normal circuit, when the time switch is not employed, is from switch, $H^3$, connection, $e^5$, hand operated switch, $e^6$, and connection, $e^7$, to main $G^5$.

The time switch may be of any suitable type, but, I prefer to employ one provided with a mechanism for moving a hand or switch lever about a dial. In the drawing, the time switch $H^4$, is shown as having a movable hand or lever $v$, which is in electrical communication with the main $G^5$. As the lever $v$, revolves about its point of pivoting, it is adapted to engage with a contact $v'$, which is in electrical connection with the other main $G^6$.

In the electrical circuit connecting the contact $v'$, with the main $G^6$, is included the coil $v^2$ of a solenoid provided with a movable core adapted to be normally positioned out of its position of equilibrium, so that, when an electric current is passed through the coil, the core is caused to travel longitudinally thereof, and adjacent to the one end of this coil is positioned the free end of a lever $n^4$, which lever is pivoted at $n^5$. The opposite end of the lever $n^4$, is adapted to simultaneously engage two contacts $n^2$ and $n^3$, electrically connected with the switch $H^3$, and the main $G^5$, respectively. The lever $n^4$, is adapted to be normally swung into a position to close the contacts $n^2$, and $n^3$, and thus complete the circuit between the controller $H^3$, and the main $G^5$. It will thus be manifest that, if a current is passed through the coil $v^2$ of the solenoid, the core thereof will be impelled toward the positive pole in the usual manner, and, during such movement, the forward end of said core will engage with the lever $n^4$ and turn it on its point of pivoting so that the opposite end thereof will be disengaged from the contacts $n^2$ $n^3$, with the result that the electrical current will be broken. When it is desired to again close the circuit at these points, the lever $n^4$ is swung back into engagement with the two contacts $n^2$ $n^3$, and this swinging back of the lever will return the core of the solenoid to its initial position exterior of its position of equilibrium. Thus, if it is desired to utilize the time switch $H^4$, the lever $n^4$, is swung into engagement with the two contacts $n^2$ and $n^3$, the switch $e^6$, is swung open, and the switch lever $v$, is so positioned upon the dial that the desired time will elapse before said lever will have traveled around to engage with the contact $v'$, to deënergize the track or tracks. It will, of course, be understood that, while the time switch is in service, one or more of the switch levers $s$, as the case may be, is in engagement with one or more of the contacts $r$. Manifestly, during this period of elapsed time, cars may be operated upon the tracks, the corresponding contacts $r$, of which tracks, are in engagement with the levers $s$. However, this allotted time is, preferably, of no longer duration than such as to allow a fair margin wherein to shift the cars about as desired, after which time the tracks automatically become dead, electrical energy is not wasted, and accidents due to defective insulation, etc., are avoided.

As aforestated, the hereinbefore described timing mechanism is illustrated as applied to a storage system wherein cars are stored on a series of parallel tracks which are branches of the main line. It will, however, be understood, that the timing mechanism may be employed in systems embodying a pit car, and storage tracks independent of the in-coming tracks. In this case, the in-coming tracks and the storage tracks should be similarly equipped, and the pit car employed might be of the type described and claimed in my earlier application, Serial No. 480,222, filed Feb. 26th, 1909, of which this application is a division.

In Fig. 2, I have illustrated the adaption of the invention to a system having a pit car, but, for simplicity of illustration and description, have shown, only, the series of in-coming tracks. It will be understood, however, that the storage tracks would be similarly equipped and that the transfer car pit and platform car operate the same as heretofore described. Moreover, in this showing, I have omitted the timing mechanism, since its use is not absolutely compulsory.

Referring to Fig. 2, $T'$ represents the power house generator, $G^7$, the overhead main, and $G^8$, the grounded main. $A^3$ represents the series of in-coming tracks, each having its local trolley wire, $a^5$. $H^5$ is a switch of the same general type as switch, $H^3$, described in connection with Fig. 1, $s'$ being the switch lever and $r'$ the several contacts. 14 is the movable member of the circuit breaker and 13 the coil thereof.

While the particular construction of the switch levers $s$, of the controller $H^3$, of Fig. 1, is not so pertinent when the timing device is employed, it is preferable that switch levers $s'$ of the controller $H^5$ of Fig. 2 are made with spring arms so that their free ends are normally held out of engagement with the contacts $r'$. Thus, in order to complete the various circuits at the controller $H^5$, the operator must impel the levers $s'$, against the contacts $r'$, and when he removes his hand therefrom the circuits should become broken. Thus the operator can not forget and leave the tracks "alive" in embodiments of the invention where the automatic timing mechanism of the invention is not included. The circuit will be readily understood, and is as follows: from main, $G^7$, to switch, $H^5$, lever $s'$, contact, $r'$, and, as shown, through connection, $r^2$, to coil 13, whereby said coil is energized. As previously described in connection with Fig. 1, said coil overcomes the action of the spring of weight which holds movable member 14 in open position. The result is that local trolley wire, $a^5$, is energized by the circuit established from main, $G^7$, movable member 14, to trolley wire, $a^5$, as long as coil 13 remains energized. It will thus be obvious that the system described in connection with Fig. 1, as well as that described in connection with Fig. 2, is applicable to a series of tracks in a car barn or other location any one or more of which it is desired to energize, and in systems either with or without a car pit.

It will be obvious that various changes in the system as described, as well as in different applications thereof, may be made without departing from the spirit of the invention, so long as they come within the scope of the appended claims.

Having thus fully described the invention, what I claim as new, and desire to secure by Letter Patent is:—

1. In a system of the class described, a plurality of tracks, electric circuits associated therewith, and unitary means for energizing any one or a series of said circuits from a common source of electrical energy.

2. In a system of the class described, a plurality of tracks, electric circuits associated therewith, a source of electrical energy, and unitary means for precluding the uninterrupted energizing of said circuits from said source of energy for an extended period.

3. In a system of the class described, a plurality of tracks, electric circuits associated therewith, and unitary means operable at will, for energizing any one or a series of said circuits, said means being of such character as to preclude the operator from leaving said circuits energized for an extended period.

4. In a system of the class described, a plurality of tracks, electric circuits associated therewith, a source of electrical energy, and selective mechanism whereby any one or a series of said circuits may be energized, said selective mechanism being dependent, for its operation, on the presence of the operator.

5. In a system of the class described, a plurality of tracks, electric circuits associated therewith, and means for controlling the energizing of any one or more of said circuits from a common source of electrical energy for a predetermined period.

6. In a system of the class described, a plurality of tracks, electric circuits associated therewith, a common source of electrical energy, and means for automatically energizing or deënergizing any one of said circuits from said common source of energy for a predetermined period.

7. In a system of the class described, a plurality of tracks, electric circuits associated therewith, a source of electrical energy, an electrical controlling switch coöperating with said circuits and source of energy whereby any one or more of said circuits may be energized, and timing mechanism for automatically governing the period during which a given circuit is energized.

8. In a system of the class described, a plurality of tracks, electric circuits associated therewith each of said tracks, a source of electrical energy, a controlling switch cooperating with said source of energy and with said track circuits, whereby the electrical current may be caused to energize any one or a series of said circuits to the exclusion of the remainder of said circuits, and timing mechanism for automatically governing the period during which the circuit of any given track, or circuits of a series of tracks, is energized.

9. In a system of the class described, a plurality of tracks, electric circuits associated therewith, a source of electrical energy, a branch circuit leading from said source of energy to each of said circuits, a controller included in said branch circuits whereby the admission of current to one or more of said circuits may be governed at will, and timing mechanism coöperating with said circuits and with the source of energy for the purpose of automatically controlling the time during which it is desired to energize the circuit or circuits of any given track or series of tracks.

10. In a system of the class described, a plurality of tracks, electric circuits associated therewith, a source of electrical energy, a branch circuit leading from said source of energy to each of said circuits, a controller included in said branch circuits whereby the admission of current to one or more of said circuits may be governed at will, and timing mechanism coöperating with said circuits and with the source of energy for the purpose of automatically de-energizing a given circuit, or series of circuits, at the expiration of the predetermined time it is desired to energize it or them.

11. In a system of the class described, a plurality of in-coming tracks, a plurality of storage tracks, electrical circuits associated therewith and means for governing the electrical energizing of any one of the electric circuits associated with the said storage tracks for a predetermined period from a source of electrical energy.

In testimony whereof I have signed my name to this specification in the presence of two subscribing witnesses.

THOMAS F. MULLANEY.

Witnesses:
CORNELIUS ZALRISKIE,
F. S. FITZSIMONS.